April 16, 1963   W. W. GRIMES   3,085,851
CATALYTIC REFORMER GAS HANDLING SYSTEM
Filed June 17, 1958
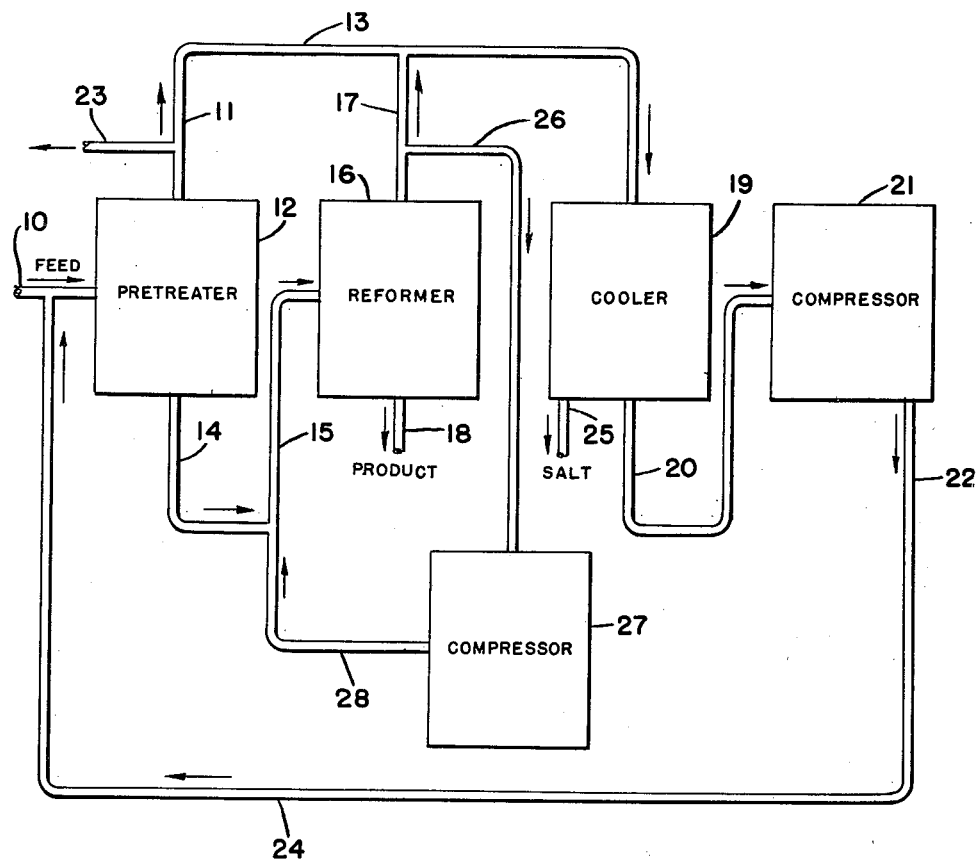
INVENTOR
WILLIAM W. GRIMES
BY *Leland L. Chapman*
ATTORNEY

United States Patent Office 3,085,851
Patented Apr. 16, 1963

3,085,851
CATALYTIC REFORMER GAS HANDLING SYSTEM
William W. Grimes, Cleveland, Ohio, assignor to The Standard Oil Company, Cleveland, Ohio, a corporation of Ohio
Filed June 17, 1958, Ser. No. 742,538
2 Claims. (Cl. 23—2)

The present invention relates to an improved system for handling the gas utilized in connection with a catalytic reforming process.

Catalytic reforming processes are widely practiced in the petroleum refining industry for the purpose of upgrading the octane number of the heavy naphtha fraction of crude oil. The process is conducted by passing a suitable hydrocarbon charge stock over a platinum-containing catalyst at an elevated temperature and pressure in the presence of substantial amounts of hydrogen. Significant quantities of hydrogen are produced in the catalytic reforming process, and it is necessary to continuously recycle at least part of the hydrogen produced in order to depress the formation of carbonaceous deposits on the catalyst which would otherwise lead to a rapid loss of catalyst activity.

Care must also be exercised to avoid poisoning of the platinum catalyst employed in the reforming process. Olefins and organic compounds containing sulfur, nitrogen, and arsenic among others have a deleterious effect on the catalyst. Since the usual charge stock to the process contains certain of these deleterious compounds, it is a conventional practice to pretreat the feed before contacting it with the platinum catalyst. The pretreatment is usually conducted in a separate vessel under conditions of elevated temperature and pressure. A catalyst is usually employed in the pretreatment step and this may be, for example, cobalt molybdate. It is also necessary to effect the pretreatment step in the presence of added hydrogen.

It is conventional practice in the catalytic reforming art to recycle the hydrogen-rich gas separated from the catalytic reformer products to the reforming reactors. Usually, however, there is an excess of hydrogen produced in the reforming reaction and this gas is known as make gas. It has the same composition as the recycle gas and it is predominantly hydrogen. Since the pretreater will ordinarily consume hydrogen, especially when the feed to the pretreater contains significant quantities of olefins, it is customary to feed the make gas from the reforming reaction to the pretreater along with the gas which is separated from the products of the pretreating reaction. However, the gas from the pretreater contains minor amounts of ammonia which results from the catalytic treatment of the nitrogen compounds in the feed. The make gas from the reformer contains minor amounts of chloride usually in the form of hydrogen chloride which may be introduced with the feed or removed from the catalyst during operation. When the streams are combined the ammonia and chloride will combine chemically to form ammonium chloride. This salt has a relatively low vapor pressure and consequently it tends to precipitate from the gas in the form of solid particles which will interfere with the normal operation of the compressor. Accordingly, it is the object of this invention to provide a means for removing ammonium chloride from the combined gas stream before it is introduced to the compressor.

This and other objects of my invention are accomplished by passing the combined gas stream from the pretreater and reformer into a cooler where the ammonium chloride salt will agglomerate on the cool surface of the cooler. The salt-free gas is then introduced into the compressor. By the method of this invention considerable savings in compressor maintenance are obtained as well as longer periods of trouble-free compressor operation.

The cooler which is employed in connection with the process of this invention may be any conventional heat exchange equipment which provides a cool surface upon which the salt may deposit, for example, a double pipe heat exchanger. Likewise, the heat transfer medium employed in the heat exchange equipment is in no way critical. However, for economic reasons I prefer to employ water as the heat transfer medium. The cooling water may be circulated in a closed system employing a cooling tower as the economics of the situation may dictate.

Means must be provided for removing the salt which will deposit in the cooler, but there is nothing critical about the manner of removal and any convenient means may be employed. For example, mechanical means such as a rotary scraper may be utilized. Another suitable means is water washing as the deposits are highly soluble in water.

The process of the invention will be better understood by reference to the attached patent drawing wherein a schematic flow diagram of the process is presented. Referring now to this drawing, the hydrocarbon feed stock enters the pretreater 12 through line 10. The pretreated hydrocarbon is transferred from the pretreater 12 by means of lines 14 and 15 to the reformer 16. Catalytic reformate is removed from the reformer 16 through line 18. The gas stream from the reformer is circulated through line 26 to the compressor 27 where it is recompressed. Subsequently, the compressed gas from the compressor 27 is transferred through line 28 to line 15 where it is mixed with the reformer feed. Make gas is removed from the reformer through line 17 to line 13 where it is combined with the gas from the pretreater 12. Any excess gas may be vented from the system through line 23 which is connected to line 13.

The gas is next transported through line 13 into the cooler 19 whereupon any salt present in the gas is precipitated on the surfaces of the cooler 19. The salt-free gas leaves the cooler through line 20 whereupon it is introduced into compressor 21. The salt which is deposited in the cooler 19 is removed periodically through line 25 by means not shown but which have been explained hereinabove. Likewise, the heat transfer medium is not shown as the purpose of the drawing is merely to explain the process and not those mechanical details such as will be obvious to a person skilled in the art.

Compressed gas leaves the compressor 21 through line 22 whereupon it is recirculated by means of line 24 to the pretreater 12.

The following example will illustrate the preferred embodiment of my invention:

13,000 b.p.d. of a crude naphtha and coker distillate mix derived from Illinois and East Texas crude oils and having the following analysis were charged to the pretreater.

° API _____ 53.3
ASTM distillation:
    IBP, ° F. _____ 202
    10 _____ 249
    50 _____ 307
    90 _____ 379
    EP _____ 401
Paraffins, vol. percent _____ 55
Olefins, vol. percent _____ 4
Naphthenes, vol. percent _____ 31
Aromatics, vol. percent _____ 10
Basic nitrogen, p.p.m. _____ 9.3
Total sulfur, wt. percent _____ 0.05

The pretreater contained a cobalt molybdate catalyst and it was operated under the following conditions:

| | |
|---|---|
| Temperature °F | 700 |
| Pressure p.s.i.g. | 825 |
| Hydrogen recycle per bbl. of charge (s.c.f.) | 830 |
| Space velocity (LHSV) | 4.5 |

The treated naphtha charge stock was then charged to a conventional catalytic reformer. The catalyst employed in the reformer was of the usual alumina-platinum-fluorine type and the reformer was operated under the following conditions:

| | |
|---|---|
| Average Temperature [1] °F | 950 |
| Pressure p.s.i.g. | 575 |
| Hydrogen recycle per bbl. of charge (s.c.f.) | 8,000 |
| Space velocity (LHSV) | 1.5 |

[1] It is to be understood that the catalytic reformer involves a plurality of reactors which are employed serially. In accordance with the usual practice the charge stock is reheated between the various reactors by means of furnaces. Consequently, the temperature given is an average temperature of the feed to all the reactors.

The combined gas stream from the reformer and pretreater had a volume rate of flow of 7,500 s.c.f.m. at a temperature of 100° F. and a pressure of 490 p.s.i.g. This gas stream passed through a double pipe heat exchanger which had a duty of 245,000 B.t.u.'s per hour which cooled the gas to 70° F. The gas leaving the cooler was substantially devoid of ammonium chloride. After compression to a pressure of 900 p.s.i.g., the gas was transferred to the pretreater.

The process of this invention has made it possible to operate continuously for long periods without any shutdowns being necessitated by the fouling of the compressor. Prior to the adoption of this process it was usually necessary to shut down the unit frequently in order to perform maintenance on the compressor and remove deposits therefrom. Thus, it will be apparent to those skilled in the art that the process of this invention offers considerable operating economies.

It will also be obvious to those skilled in the art that various modifications of the process of this invention may be made; and, consequently, I desire this application for Letters Patent to cover all such modifications as do not depart from the spirit and scope of the appended claims.

I claim:

1. In a catalytic reformer gas handling system wherein a first gas stream comprising a major amount of hydrogen and a minor amount of ammonia is withdrawn from a pretreater reactor and admixed with a second gas stream comprising a major amount of hydrogen and a minor amount of hydrogen chloride withdrawn from a catalytic reforming reactor in order to provide a recycle hydrogen stream for said pretreater reactor following a compression step in which the pressure of the gaseous mixture is increased to the pressure of the pretreater reactor, a method of precluding the deposition of ammonium chloride, which is formed by reaction between said ammonia in said first gas stream and said hydrogen chloride in said second gas stream, in the compressor during said compression step which comprises introducing said gaseous mixture into a cooler prior to said compression step whereby any ammonium chloride in said gaseous mixture agglomerates on the cool surface of the cooler and can be removed from said surface periodically.

2. The process of claim 1 comprising the additional step of periodically removing deposited ammonium chloride from said cooler.

References Cited in the file of this patent

UNITED STATES PATENTS

| | | |
|---|---|---|
| 2,162,933 | Bolinger et al. | June 20, 1939 |
| 2,783,142 | Singleton et al. | Feb. 26, 1957 |
| 2,905,626 | Sutherland | Sept. 22, 1959 |
| 2,929,772 | Gilmore | Mar. 22, 1960 |